H. R. DERBY.
ROLLER.
APPLICATION FILED NOV. 11, 1908.
925,308.
Patented June 15, 1909.
2 SHEETS—SHEET 1.
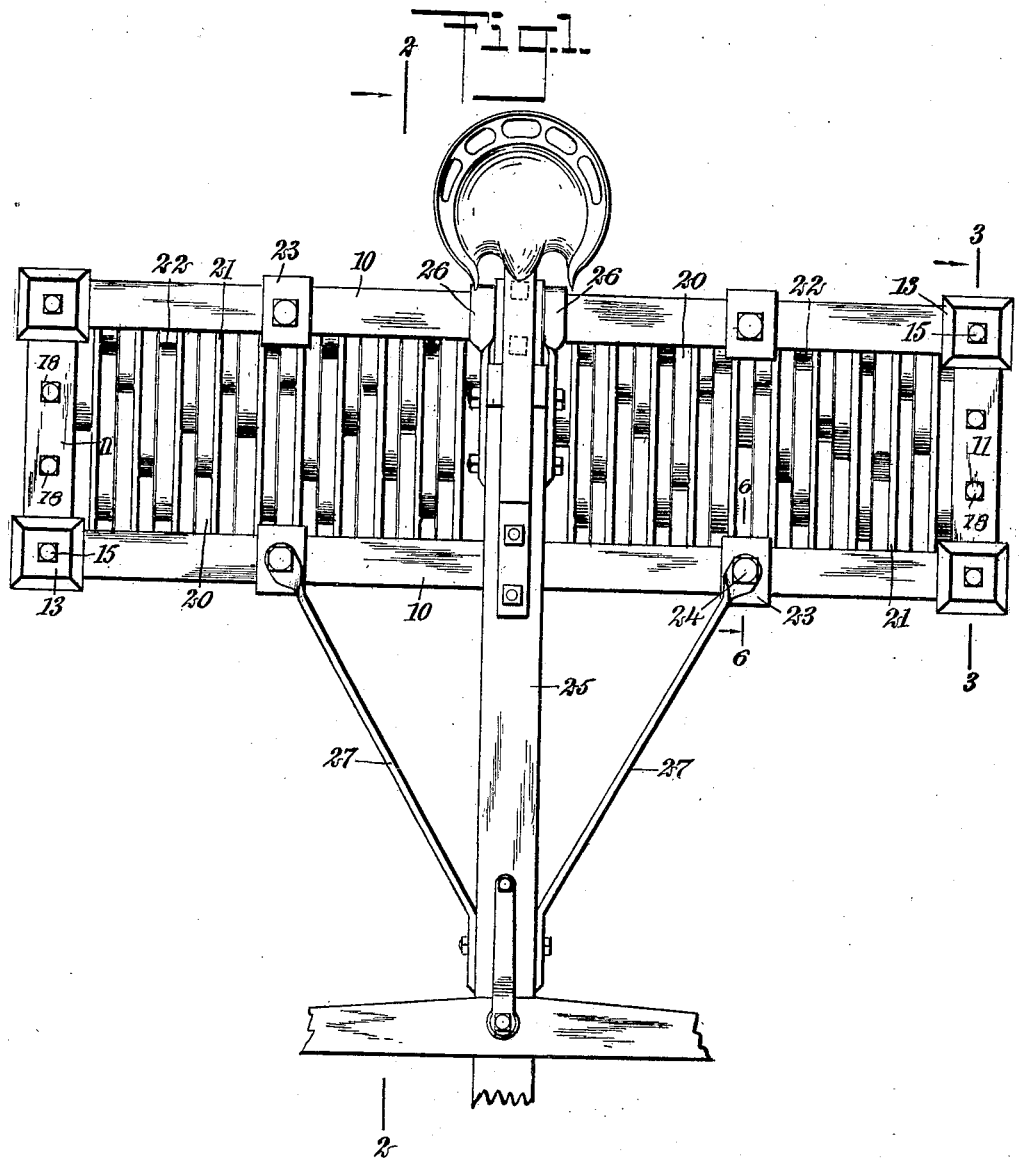

H. R. DERBY.
ROLLER.
APPLICATION FILED NOV. 11, 1908.
925,308.
Patented June 15, 1909.
2 SHEETS—SHEET 2.
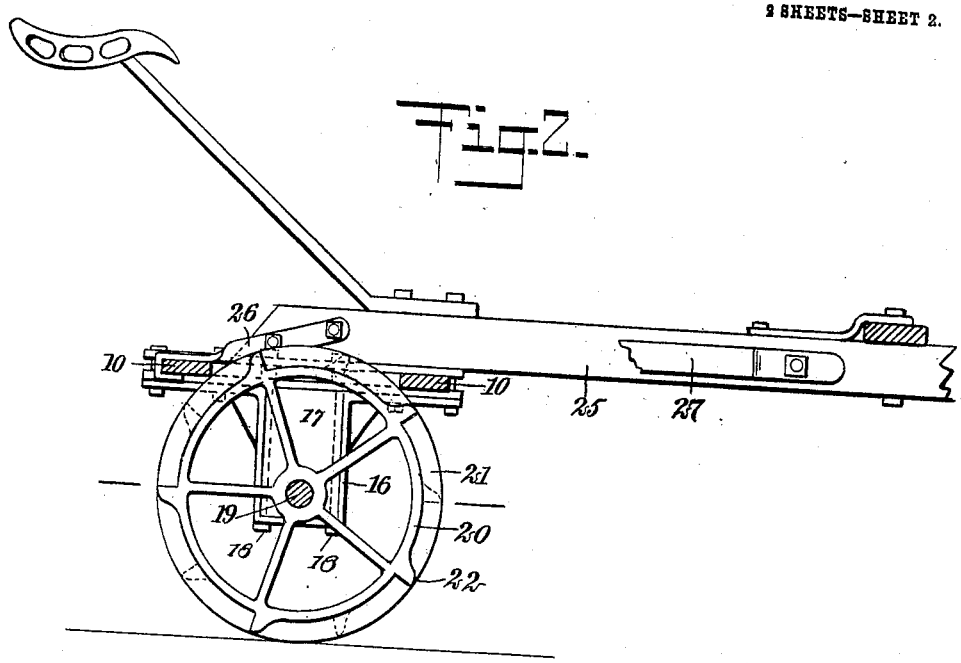
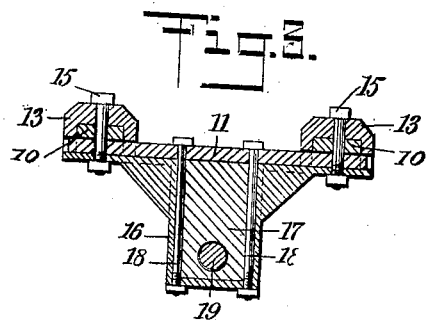
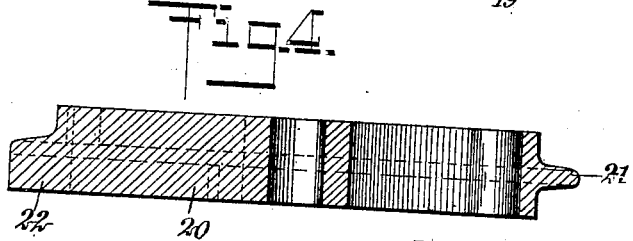
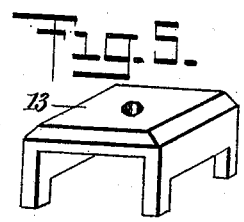
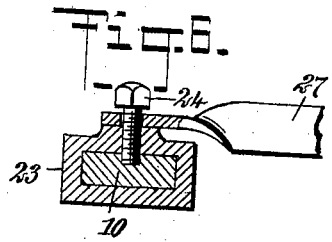
WITNESSES
INVENTOR
Harold R. Derby
BY
ATTORNEYS

UNITED STATES PATENT OFFICE.

HAROLD R. DERBY, OF JERSEYVILLE, ILLINOIS.

ROLLER.

No. 925,308. Specification of Letters Patent. Patented June 15, 1909.

Application filed November 11, 1908. Serial No. 462,055.

*To all whom it may concern:*

Be it known that I, HAROLD R. DERBY, a citizen of the United States, and a resident of Jerseyville, in the county of Jersey and State of Illinois, have invented a new and Improved Roller, of which the following is a full, clear, and exact description.

The invention is a roller suitable for both pulverizing and smoothing the ground, the pulverizing taking place when the roller is moved in one direction, and the smoothing performed when the roller is moved in the opposite direction. These two different operations I am enabled to successfully perform by a single roller constructed with a series of disks independently revoluble, each disk having an approximately central rib, with teeth projecting from each face of the rib, having radial or pulverizing faces at one side and rounded or inclined smoothing faces at the opposite side.

Reference is to be had to the accompanying drawings forming a part of this specification, in which similar characters of reference indicate corresponding parts in all the views.

Figure 1 is a plan of my improved roller complete; Fig. 2 is a section substantially on the line 2—2 of Fig. 1; Fig. 3 is a section on the line 3—3 of Fig. 1; Fig. 4 is a longitudinal section through one of the roller disks; Fig. 5 is a perspective view of one of the corner caps of the frame; and Fig. 6 is a section substantially on the line 6—6 of Fig. 1.

The frame of the roller is made up of cross-beams 10 and end beams 11 having overlapping ends, with corner caps 13 slotted out at opposite sides, as clearly shown in Fig. 5, to fit over and engage the beams at opposite edges. A bolt or other equivalent device 15 passes through each cap and the overlapping ends of the beams, as also through the ends of a bearing hanger 16, which, as best shown in Fig. 3 carries a bearing block 17 which is further secured to the end beams by bolts 18 passing through its opposite edges. In the bearing block 17 is carried an axle 19, on which is journaled the roller proper, the same consisting of a series of disks or wheels 20 arranged closely adjacent to each other and independently revoluble, each disk having a substantially central circumferential rib 21, with teeth 22 projecting from opposite faces of the rib, with the points of the teeth substantially flush with the circumference of the rib. The teeth at one side of the rib are in staggered relation to the teeth at the opposite side of the rib, and the teeth have approximately radial or pulverizing faces at one side and rounding or inclined smoothing faces at the opposite side, as best shown in Fig. 2.

At each side of the roller the beams 10 carry collars 23 adjustably held in place by set-screws 24, and between the collars a tongue 25 is detachably connected to the beams 10, the connection being effected at the rear end of the tongue by hooks 26 which are secured to opposite faces of the tongue and engage under the rear beam. The tongue is further secured to the frame by oblique braces 27 which are attached to the side faces of the tongue near the doubletree, and are secured to the frame by the set-screws 24 of the front or adjacent collars. With the tongue applied to that side of the frame as shown in the drawings, when the machine is in operation the radial faces of the teeth on the roller will operate to tear up and pulverize the ground. When the teeth of one disk strike an object, such as a large clod, the disk will momentarily stop and the adjacent disk will continue to revolve and pulverize the clod before the roller passes completely over it. If the roller is to be used for smoothing, the tongue is detached and applied to the opposite side of the frame similarly as shown to be applied in the drawings.

Having thus described my invention, I claim as new and desire to secure by Letters Patent:

1. In a roller, the combination of an axle, and a series of roller disks journaled on the axle and independently revoluble, each disk having a circumferential central rib with teeth at opposite faces thereof, the teeth having smoothing faces at one side and crushing faces at the opposite side.

2. In a roller, a roller disk having a central circumferential rib, with teeth at opposite faces of the rib, the teeth having approximately radial faces at one side and inclined faces at the opposite side.

3. In a roller, the combination of an axle, and a series of roller disks carried on the axle, each disk having a central circumferential rib, with teeth projecting from opposite faces of the rib, each tooth having a pulverizing face and a smoothing face.

In testimony whereof I have signed my name to this specification in the presence of two subscribing witnesses.

HAROLD R. DERBY.

Witnesses:
STEPHEN CATT,
CHAS. I. CATT.